United States Patent [19]

Cummings

[11] 4,201,188
[45] May 6, 1980

[54] SOLAR COLLECTOR AND HEAT TRAP

[75] Inventor: Richard D. Cummings, Reading, Mass.

[73] Assignee: Exxon Research & Engineering Co., Florham Park, N.J.

[21] Appl. No.: 902,857

[22] Filed: May 4, 1978

[51] Int. Cl.² .............................................. F24J 3/02
[52] U.S. Cl. .................................... 126/429; 126/446
[58] Field of Search .............. 126/270, 271; 237/1 A; 165/48, 49

[56] References Cited

U.S. PATENT DOCUMENTS

| | | | |
|---|---|---|---|
| 3,939,818 | 2/1976 | Hamilton et al. | 126/271 |
| 4,019,496 | 4/1977 | Cummings | 126/271 |
| 4,043,317 | 8/1977 | Scharfman | 126/270 |
| 4,051,999 | 10/1977 | Granger | 126/270 |
| 4,062,346 | 12/1977 | Rapp, Jr. et al. | 126/270 |
| 4,103,825 | 8/1978 | Zornig | 237/1 A |
| 4,121,565 | 10/1978 | Grisbrook | 126/270 |
| 4,130,108 | 12/1978 | Patil | 126/270 |

Primary Examiner—James C. Yeung
Attorney, Agent, or Firm—Joseph J. Dvorak

[57] ABSTRACT

A solar collector unit of triangular transverse cross section is provided with a corrugated heat trap element on at least the rear vertical wall of the collector. The heat trap element has a V-shaped cross section, the angle of the V being in the range of about 35° to about 55°. The heat trap element, in part, serves to increase the effective heat transfer surface of the collector at relatively little expense. Additionally, the corrugated member serves as a channel for direction of the flow of fluid to be heated through the collector.

13 Claims, 12 Drawing Figures

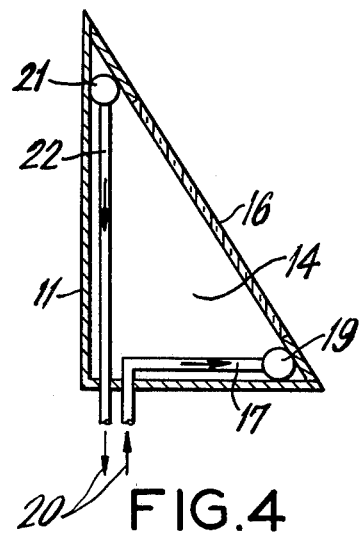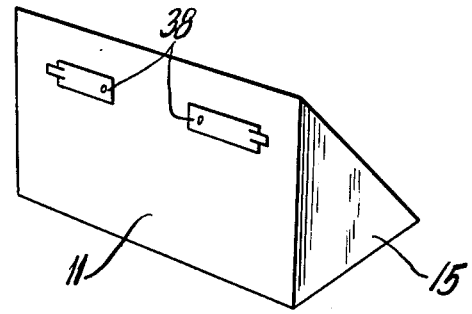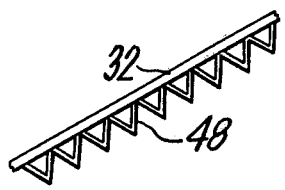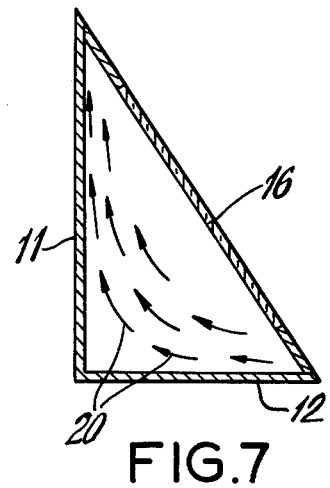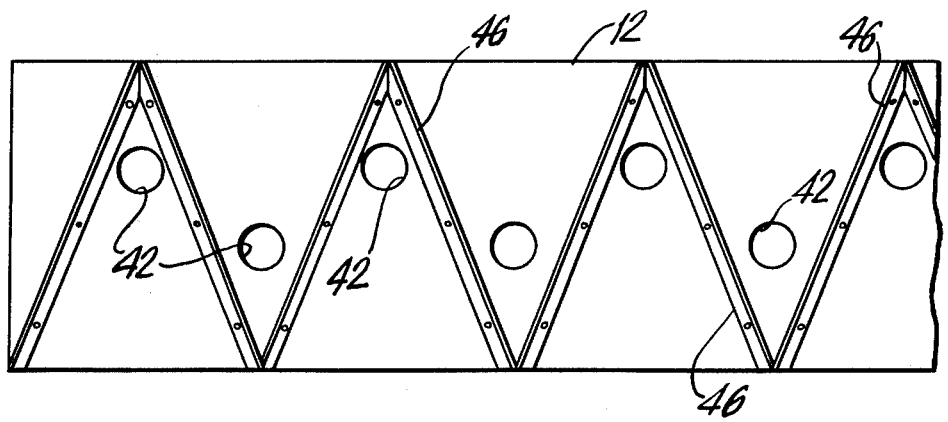

SOLAR COLLECTOR AND HEAT TRAP

BACKGROUND OF THE INVENTION

This invention relates to radiant energy collection devices and in particular to solar energy collectors utilizing air or a similar fluid as the heat transfer media.

Many different solar collector devices have been developed in the prior art for collecting and utilizing radiant energy received from the sun. Typically, such prior art devices are rectangular boxes having glass or other light transparent surfaces suspended above a solar absorbing surface which is oriented to absorb sun rays. In these collectors a fluid is passed in heat exchange relationship with the solar absorbing surface. Such collector devices are known as flat plate collectors.

Some flat plate collectors utilize a liquid such as water as the heat transfer medium. Among the disadvantages of flat plate collectors employing a liquid as the heat transfer medium is the need for extensive plumbing, liquid circulating pumps, and the like, in order to transfer the heat from the point of collection to the point of use. These necessary components add significantly to the cost of utilizing such a solar radiation system.

Another type of flat plate collector uses a fluid such as air as the heat transfer medium. Among the problems encountered in flat plate collectors utilizing air as the heat transfer medium is the need to provide for sufficient turbulence of the air in the flat plate collector to assure good heat transfer. Additionally, means are required to prevent heat loss by convection backwardly through the transparent member of the collector.

Both types of flat plate collectors have additional deficiencies in that, in order to provide a collector with a large enough heat absorption surface, it has been necessary in the past to assemble a plurality of flat plate collectors to provide a collector area large enough to satisfy the requirements of a particular building. Since each flat plate collector has its own housing and insulation, this modular construction provides for a degree of flexibility but at the expense of weight and cost of the overall solar collector assembly. Obviously not all roof structures will be able to support such significantly high weights from joining many collector modules; and, to construct a roof structure which will support the weight adds to the expense of the solar energy system.

Thus, there remains a need for a solar collector unit which is more economical and efficient than collectors encountered in the prior art.

SUMMARY OF THE INVENTION

Generally speaking, the solar energy collector of the present invention is a cavity-type collector unit having a vertical back wall, a horizontal base and a light transparent collector face. The transverse cross-sectional configuration of the unit is triangular. This configuration is particularly suitable for integrating the solar energy collector into the roof or attic structure of a house or building having a generally southerly facing sloped roof.

Significantly, at least the back wall of the collector is substantially covered by a corrugated heat trap element. Preferably a similar corrugated heat trap element is provided on the base of the cavity collector as well.

The collector contains an air duct in the lower part of the front of the collector for cold air to enter into the cavity. A manifold for hot air to be removed from the cavity is located in the upper part of the back space of the cavity. The exhaust air manifold is in communication with the channels provided by the walls of the corrugated heat trap element.

Preferably the corrugations of the heat trap element are alternating V-shaped channels and tunnels having an angle formed by two sloping sides meeting in the range of about 35° to about 55° and preferably about 45°.

Advantages and other features of the invention will be apparent from the specification which follows and from the drawings wherein like numerals are used throughout to identify like parts.

BRIEF DESCRIPTION OF THE DRAWINGS

FIG. 4 is a diagrammatic end view of a solar heating unit of this invention.

FIG. 5 is a back view of one collector of this invention.

FIG. 6 is a schematic illustration of a pleated insulation member and glazing for one collector unit of the present invention.

FIG. 7 is a schematic diagram illustrating air flow through the collector of this invention.

FIG. 8 illustrates the arrangement of air ports for communicating with the corrugated heat trap member of this invention.

DETAILED DESCRIPTION OF THE INVENTION

Figure 1:
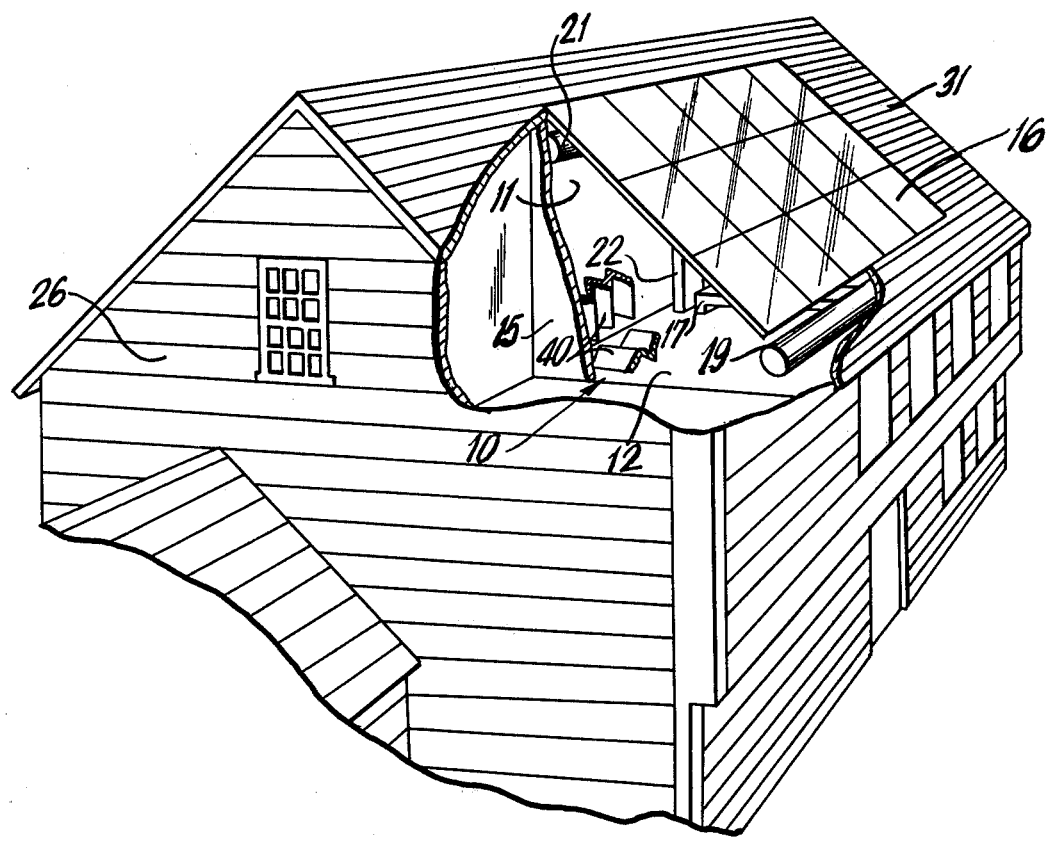
FIG. 1 is a generally schematic perspective view of a building, partially cut away, showing a solar heating unit of this invention integrated in the roof and attic structure thereof.

The solar energy collector illustrated in the drawings comprises a cavity collector unit 10 having a vertical rear wall 11, a horizontal base 12, vertical side walls 14 and 15 and an inclined light transparent front wall 16. As can be seen in the Figures, the transverse cross-section of the cavity unit is substantially triangular in configuration. The collector includes a cold air duct 17 for supplying cold air to cold air manifold 19 and ultimately through the collector in the direction of arrows 20 which is then collected by hot air manifold 21 which feeds into duct 22.

The collector unit preferably is integrated into house or building structure 26 in such a manner that many of the structural components of the cavity serve also as the structural components of the house or building 26. Thus, for example, the horizontal base 12 of the cavity can be supported on 2×6 floor joists 28. For the vertical wall support, 2×4 studding 29 is used. The studding 29 for the back vertical wall 11 can be conveniently tied to the 2×6 rafters 30 and floor joists 28. As is shown in FIG. 3, the front light transparent member 16 of the solar collector is inclined in the same plane so as to be coextensive with and part of the roof 31 of building 26.

Figure 3:
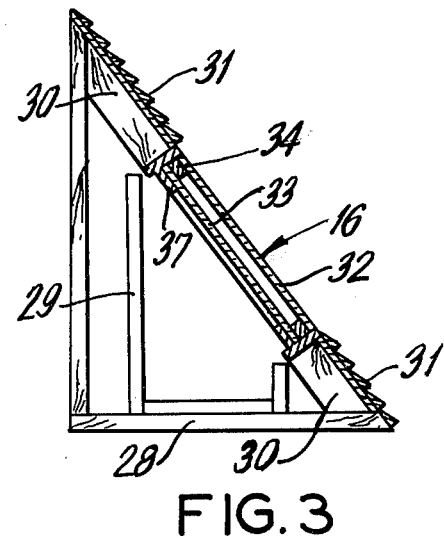
FIG. 3 is a diagrammatic cross-sectional view of a solar heating unit of the present invention.

In the embodiment shown in FIG. 3, the transparent surface 16 consists of two layers of glass 32 and 33 separated by a spacer 34. Aluminum T's 37 are provided for mounting the glass on the rafters 30.

Figure 2:
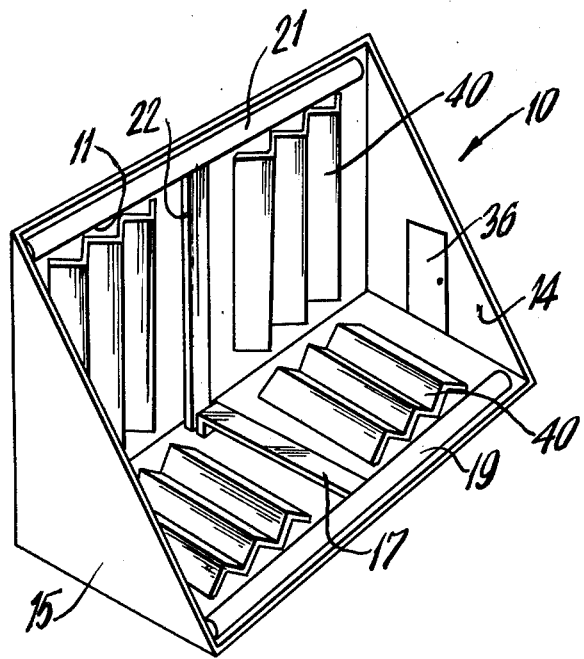
FIG. 2 is a perspective view of the cavity solar collector of FIG. 1.

As is shown in FIG. 2, a door 36 is provided for ingress and egress into the cavity of the collector unit.

Optionally and preferably means are provided for venting the cavity such as hinged doors 38 shown in FIG. 5 placed on the top of the vertical rear wall of the cavity collector 10. In one embodiment these doors will be manually operated and used only when the system is totally inoperational, for example, when the building is not being occupied during long periods of time thereby preventing excessively high stagnation temperatures. Additionally, depending upon the use to which the heated air from the collector is put, and depending upon the total system in which the heat collector is integrated, the collector may be manually vented by means of doors 38 during summer months, for example. Preferably, however, these doors 38 will be spring loaded and set open at 212° F. thereby providing protection against high stagnation temperatures accumulating in the collector unit.

The horizontal base 12, the vertical rear wall 11 and the vertical side walls 14 and 15 are preferably insulated surfaces having at least 2" of insulation having an R value of about 13. Any type of insulation can be used such as fiberglass, urethane foams and the like. As indicated with respect to FIG. 3, the front inclined light transparent surface can be a double pane of glazing. Optionally, however, a single pane of glazing may also be employed. In the event that a single pane of glazing 32 is used, it is especially preferred to include a pleated light transparent material 48 immediately below the glazing 32 so as to minimize convection and radiation heat losses. A diagrammatic cross-section of such an arrangement is shown in FIG. 6. Such a pleated material 48 can be formed, for example, from a polycarbonate plastic such as Lexan or other light transparent plastics such as polyacrylates and suspended by means of metal fingers such as steel fingers (not shown) mounted on the framing for surface 16.

The internal surfaces of the cavity collector and even the air ducts 17 and 22 and air manifolds 19 and 21 are painted black or covered by a black material. Optionally, however, only the surface of the vertical wall 11 in the horizontal base 12 need be black and the inside surfaces of side walls 14 and 15 can be converted with light reflective surfaces so that sunlight incident on those four walls will be reflected toward the heat collection area on the vertical rear wall and horizontal base.

Importantly, a corrugated heat trap element 40 is suspended below the hot air manifold on vertical rear wall 11. Preferably the corrugated heat trap 40 has a substantially V-shaped cross section. The angle of heat trap material 40 of the apex of the V formed by two adjacent extending walls that meet at a point typically will be in the range of about 35° to 55°, and preferably it will be about 45°. The heat trap member 40 can be made from a wide range of materials including black painted light weight metals such as aluminum and even black tinted plastics such as black tinted polycarbonates such as Lexan. The corrugated heat trap member 40 preferably is also placed on the horizontal base 12 so as to substantially cover the base. A plurality of openings 42 are provided in manifolds 21 and 19 so that air is in direct communication with both the tunnels and valleys defined by the corrugated heat trap member. Also, as is shown in FIG. 8, a metal bracket 46 is provided for mounting the heat trap member 40 on the manifold, for example, manifold 21.

As is shown in FIG. 4, cold air will be transported through cold air duct 17 to cold air duct 19 and will enter into the cavity via openings 42. The air then will flow both over and under the corrugated heat trap member 40 and upwardly toward the hot air manifold 21 for collection and return by hot air duct 22 to the building for use therein. The air flow pattern is shown shematically in FIG. 7 by arrows 20. Surprisingly, it has been found that the collector unit of this invention tends to be self modulating insofar as internal temperature is concerned. As the air temperature in the collector begins to rise above about 150° F., air which normally would flow within the valleys of the heat trap member 40 rises in the collector and moves toward the front surface 16, thereby rejecting some excess heat to the ambient atmosphere.

Figure 9:
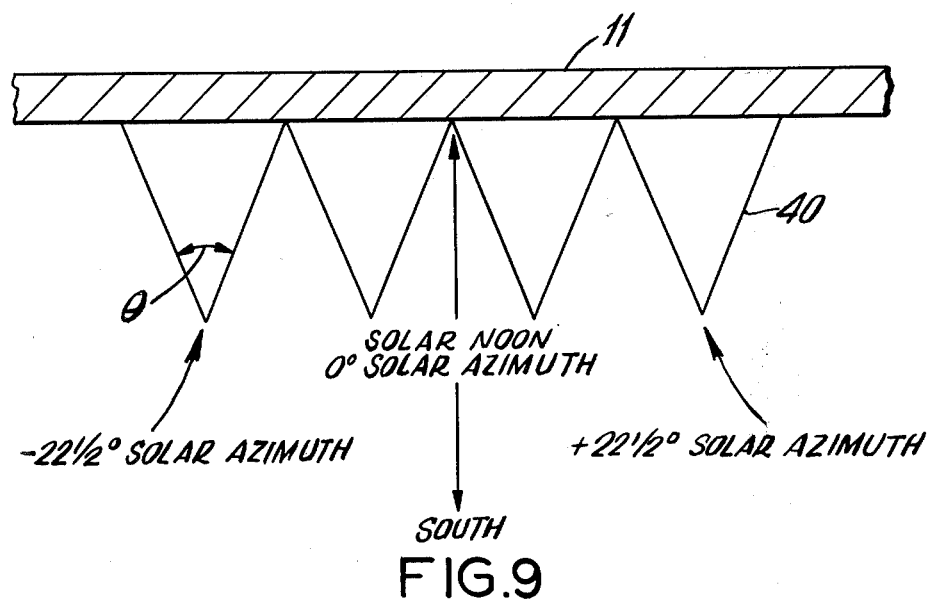
FIG. 9 schematically illustrates one of the advantages of the present invention.

As can be seen from FIG. 9, another important advantage of the heat trap member 40 is that it effectively increases the heat transfer surface of the solar collector by a significant factor without increasing the size of the cavity. For wall solar azimuths of $-22\frac{1}{2}°$ to $+22\frac{1}{2}°$, the entire member 40 is irradiated. Thus, five effective heat transfer surfaces are provided. Indeed the heat transfer area ratio is 5.23:1 over that of a bare wall. Additionally, of course, this increase in effective heat transfer surface occurs at relatively little expense. Moreover, the corrugated heat trap member 40 also serves as a channel for direction of flow of air through the cavity.

Figure 10:
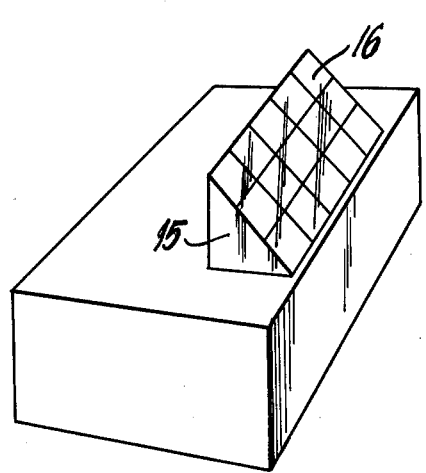
FIGS. 10, 11 and 12 illustrate different arrangements of the collector unit of the invention.
Figure 11:
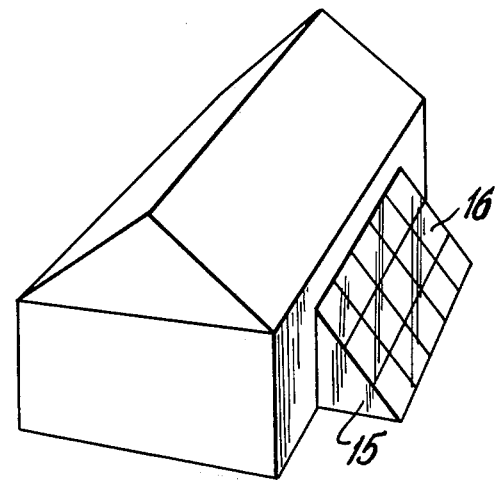
Figure 12:
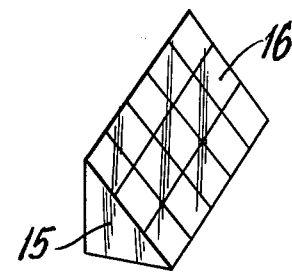

While the invention herein has been described with particular reference to a solar collector unit that is integrated into a roof structure of a building, the collector unit of the present invention can also be built as a self-supported structure for mounting on a flat roof such as shown in FIG. 10, or mounted or attached to the side of a building, such as shown in FIG. 11, or indeed it can be a self-standing, detached unit such as shown in FIG. 12.

What is claimed is:

1. A solar collector unit comprising:
 a generally triangular housing member including a vertical back wall, a horizontal base, end walls and a sloped light transparent front surface for receiving solar radiation;
 a corrugated heat trap member defining longitudinally extending tunnels and valleys suspended in front of at least part of said back vertical wall and adapted to receive solar radiation;
 means for introducing cool air adjacent to horizontal base near said front surface; and
 means for removing war air from adjacent the vertical back wall near the top thereof whereby at temperatures below about 150° F. air flows through said collector in the direction from said front surface to said vertical back wall and then upwardly through said tunnels and valleys of said heat trap member, and at temperatures above about 150° F. air which would normally flow within the valleys of the heat trap member rises in the collector and moves towards the front surface, thereby rejecting some excess heat to ambient atmosphere.

2. The solar collector unit of claim 1 wherein the corrugated heat trap member additionally covers a substantial portion of the horizontal base.

3. The solar collector of claim 2 wherein the corrugated member is substantially V-shaped in cross section, the side walls of which V-shaped member define longitudinally extending tunnels and valleys.

4. The solar collector of claim 3 wherein the angle formed by the walls of the corrugated V-shaped member is in the range of 35° to 55°.

5. The solar collector of claim 4 wherein the angle is 45°.

6. The solar heat collector unit of claim 5 wherein the means for introducing cold air into the solar collector unit consists of a duct which extends horizontally from the vertical back wall to the front of the collector unit and there joins a manifold extending at right angles to the duct for the entire length of the solar collector unit.

7. The device of claim 6, wherein the means for removing the hot air includes a horizontally mounted hot air manifold located at the top of the vertical wall of the collector and which manifold is connected to a duct extending vertically downward from said manifold to said base.

8. The solar collector of claim 7, wherein said manifolds are provided with a plurality of apertures communicating with the tunnels and valleys of said corrugated heat trap member.

9. The solar collector of claim 8, wherein said unit is integrated into the attic of a building having a sloped roof.

10. The device of claim 9 including spring loaded air vent doors whereby said doors will open when the temperature exceeds a predetermined maximum temperature.

11. A solar collector comprising:
a housing, said housing having a triangular transverse cross section defind by a vertical back wall, a base and an inclined light transparent front wll, said housing including two vertical end walls;
a corugated heat trap member, having tunnels and valleys and being adapted to receive solar radiation, said member located in front of at least part of said rear wall and covering a substantial portion of said hrizontal base, said heat trap member having a V-shaped cross section, the angle formed by the walls of said corrugated heat rap member being in the range of from about 35° to 55°;
duct means for introducing air at one temperatue into said collector in heat transfer relation with heat trap, said duct means extnding hrizontally from the vertical back wall to the front of the collector unit, and thre joining a manifold extending at right angles to the duct for the entire length of the solar collector unit; and
means for removing air at a second temperature frm said collector, said means including a horizontally mounted hot air manifold located at the top of the vertical wall of the collector and which manifold is connected to a duct extending vertically downward from said manifold to said base whreby air flows through said collector in a direction from said front surface to said vertical back wall through said valleys of said corrugated member and at temperatures above about 150° F., air which normally flows within the valleys of said heat trap rises in the collector and moves toward said front surface threby rejectig some excess heat to the ambient atmosphre.

12. The solar collector of claim 11 including a light transparent insulating member suspended immediately below said light transparent front wall.

13. The solar collector of claim 12 wherein said light transparent insulating member has a V-shaped cross section.

* * * * *